No. 892,870. PATENTED JULY 7, 1908.
A. F. MUSTEE.
WATER HEATER.
APPLICATION FILED JULY 8, 1907.
2 SHEETS—SHEET 2.
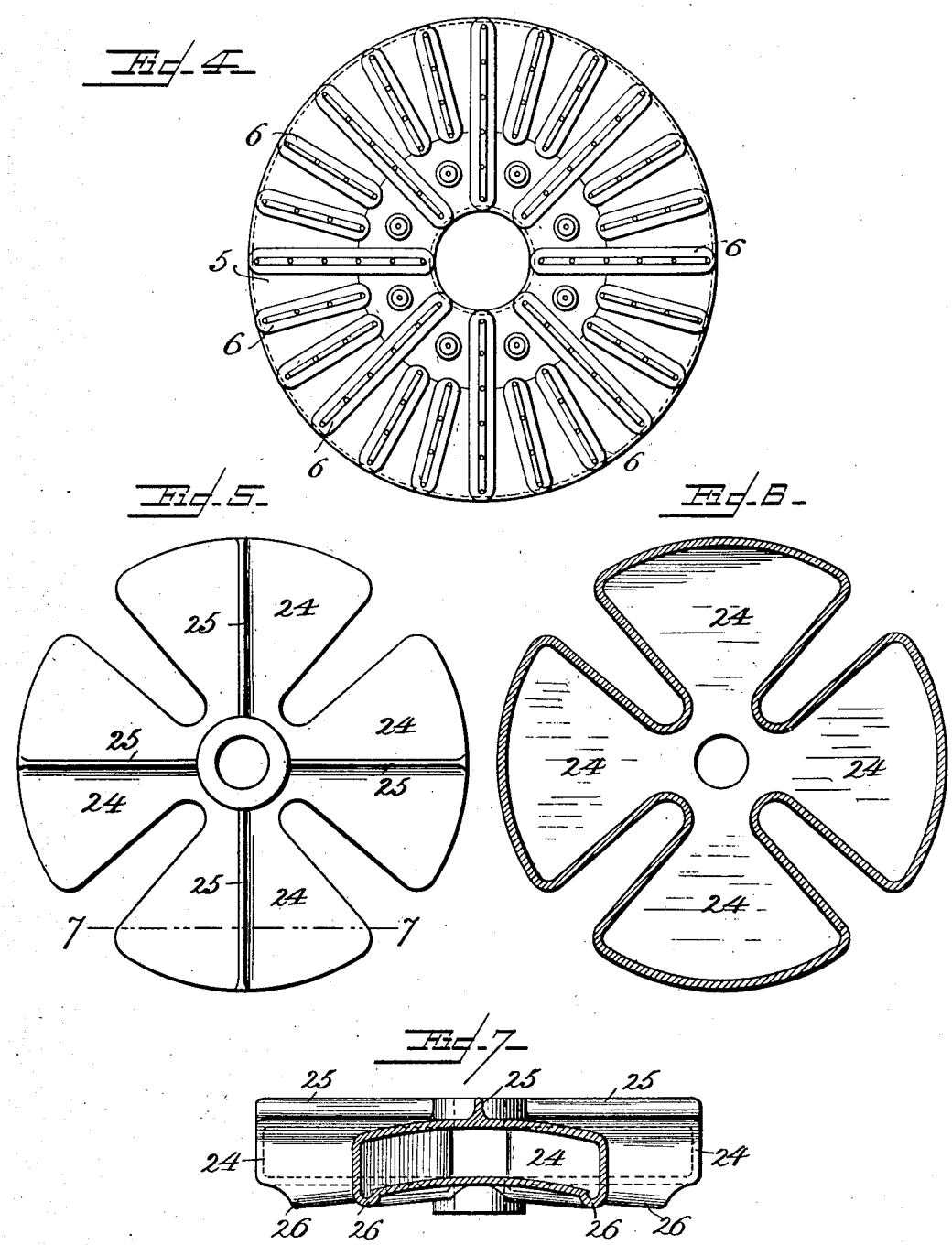

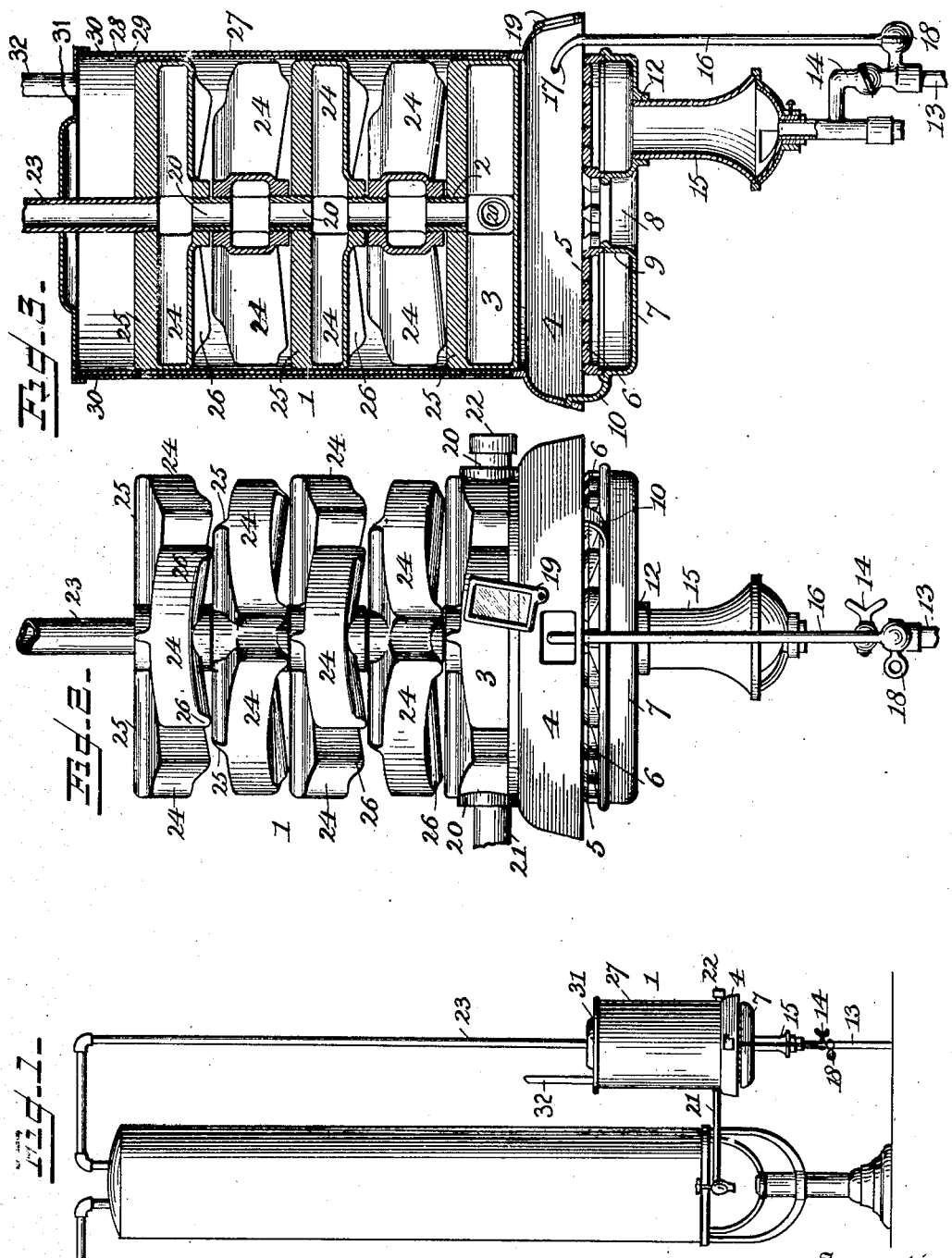

UNITED STATES PATENT OFFICE.

ALBERT F. MUSTEE, OF CLEVELAND, OHIO.

WATER-HEATER.

No. 892,870.  Specification of Letters Patent.  Patented July 7, 1908.

Application filed July 8, 1907. Serial No. 382,730.

*To all whom it may concern:*

Be it known that I, ALBERT F. MUSTEE, a citizen of the United States, residing at Cleveland, in the county of Cuyahoga and State of Ohio, have invented certain new and useful Improvements in Water-Heaters; and I do declare the following to be a full, clear, and exact description of the invention, such as will enable others skilled in the art to which it appertains to make and use the same.

This invention relates to improvements in water heaters.

The object of the invention is to provide a gas water heater adapted to be connected to a domestic boiler or other suitable tank, whereby the water therein may be quickly heated, the construction and arrangement of the parts of the heater being such as to provide a maximum amount of heating surface.

With this object in the view, the invention consists of certain novel features of construction, combination and arrangements of parts as will be more particularly described and fully pointed out in the appended claims.

In the accompanying drawing, Figure 1 is a side elevation of an improved water heater showing the same connected to a domestic boiler; Fig. 2 is a side view of the heater with the casing removed; Fig. 3 is a vertical sectional view of the heater; Fig. 4 is a plan view of the burner plate; Fig. 5 is a horizontal sectional view taken between two of the heater sections; Fig. 6 is a similar view through one of the heater sections; and Fig. 7 is a detail sectional view through one lobe of one of the heater sections on the line 7—7 of Fig. 5.

Referring more particularly to the drawings, 1 denotes the heater which consists of a plurality of hollow sections, each of which is constructed substantially in the form of a Maltese cross, said sections being arranged, when assembled, so that the lobes of one section will be disposed opposite to the space between the lobes of the next adjacent sections, thus providing tortuous passages between and round the sections through which the heat passes from the burner. The base section is provided with a centrally disposed threaded aperture in which is adapted to be screwed a nipple 2, by means of which the next adjacent section is coupled therewith. Each of the sections above the lower section is provided with alined centrally disposed threaded apertures in which nipples are screwed for connecting said sections together, one above the other. The lowermost section 3 is suitably attached to a base ring 4, beneath which and covered thereby, is a circular burner plate 5 having formed thereon a series of radially disposed upwardly projecting ribs 6, in each of which is formed a plurality of burner openings through which the gas is ignited and burns. Beneath the burner plate 5 is arranged a mixing shield 7, consisting of a saucer-shaped or concaved plate having formed therein a centrally disposed passage 8, around which is formed an upwardly projecting annular flange 9 of the same height as the outer edge of the plate. The plate or shield 7 is provided at intervals around its edge with upwardly projecting attaching lugs 10 which are adapted to be engaged with the lower edge of the base ring 4, whereby said shield and burner plate are supported.

In one side of the mixing shield 7 is formed an inlet opening 12, with which is adapted to be connected the upper end of a gas supply pipe 13 having arranged therein a cut-off valve 14, and an air-mixing tube 15. Also connected to the supply pipe 13 is a pilot burner 16, the upper end of which extends above the burner plate and is provided with a pilot light burner 17. The pilot tube 16 is also provided with a cut-off valve 18. In one side of the base ring 4, opposite to the pilot light burner is arranged an opening adapted to be covered by a transparent door 19 which may be opened to light the pilot burner. Formed in the sides of the lowermost heating section 3, at directly opposite points, are water inlet openings having connected thereto nipples 20, to one or the other of which is adapted to be connected a pipe 21 leading to the lower end of the boiler or tank containing the water to be heated. The inlet openings are provided on opposite sides of the heater so that the same may be conveniently connected to either side of a boiler or tank. The opening on the side opposite to the connection to the boiler is closed by means of a screw plug 22.

With the central aperture of the upper section is connected a water discharge pipe 23, by means of which the hot water from the heater is conducted to the upper end of the boiler or tank, as shown.

Each of the sections of the heater comprises a hollow receptacle constructed in such a manner as to provide a plurality of radially disposed lobes, each of which is substantially of triangular form, each of the sections being here shown as consisting of four lobes, 24, arranged in the form of a Maltese cross and forming water chambers or receptacles which communicate with each other at the center of the section. The upper and lower wall of each of the lobes 24 are preferably curved laterally in the form of an arc, as clearly shown in Fig. 7 of the drawings. On the upper side of each of the lobes is formed a central radially disposed upwardly projecting rib 25 which extends from near the center of the section to the outer edge of the lobe and serves to deflect the heat from the burner in opposite directions across the upper surface of the lobes. On the underside of each of the lobes 24 along their opposite edges are formed downwardly projecting heat deflecting ribs or flanges 26, which serve to turn the heat downwardly at the opposite edges of the lobes onto the upper side of the next lower section. When the sections of the heater are assembled, they are arranged one above the other and coupled together by nipples 20, as hereinbefore described, the lobe of one section being disposed opposite to the space between the lobes of the next adjacent section, so that the heat from the burner when passing upwardly will be caused to travel between and around the lobe of the sections, thereby quickly heating the water contained therein.

The sections of the heater when assembled, are adapted to be inclosed by a casing 27, consisting of an inner shell or cylinder 28 and an outer cylinder, 29. Between said inner and outer cylinders is arranged a lining 30, of asbestos or other non-conducting material. The casing is closed at its upper end by a suitable cap 31. By means of the casing 27 and the cap 31, the heat from the burner is retained and applied to the heater sections arranged in the casing. In the cap 31 is arranged a vent pipe 32, which may be connected with a chimney flue to carry off the odors from the heater,

Having thus fully described my invention, what I claim as new and desire to secure by Letters-Patent, is:

1. A water heater comprising a plurality of hollow sections connected together one above the other, each of said sections comprising a plurality of radially projecting hollow lobes, and radial heat deflecting ribs formed on said lobes, substantially as described.

2. A water heater consisting of a series of hollow sections coupled together one above the other, each of said sections comprising a plurality of radially disposed hollow curved or arc-shaped lobes, a centrally disposed radial heat deflecting rib formed on the upper side of each of said lobes, and radially projecting heat deflecting ribs formed on the opposite and lower edges of each of said lobes, substantially as described.

3. A water heater consisting of a series of hollow sections coupled together, one above the other, each of said sections comprising radially projecting lobes arranged in the form of a Maltese cross, said sections being coupled together in such a manner that the lobe of one section will be disposed opposite to the spaces between the lobes of the next adjacent sections, thereby providing tortuous heat conducting passages between and around said lobes, a centrally disposed radially projecting rib formed on the upper side of each of the lobes, downwardly projecting radially disposed ribs formed along the opposite lower edges of each of the lobes, a burner arranged beneath said heater, and means to inclose said burner and support said sections, substantially as described.

In testimony whereof I have hereunto set my hand in presence of two subscribing witnesses.

ALBERT F. MUSTEE.

Witnesses:
 A. E. SICHU,
 GUS ELLING.